G. W. BAKER.
Fruit-Gatherers.
No. 199,250.  Patented Jan. 15, 1878.
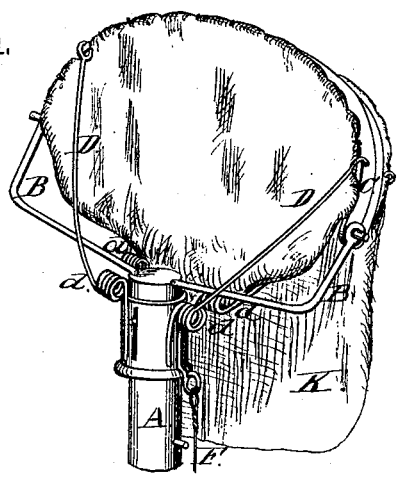
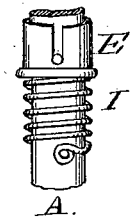
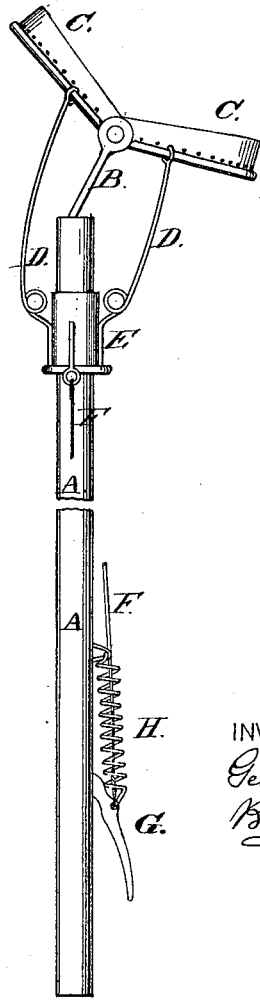
ATTEST:
Chas Hall
Le Blond Burdett
INVENTOR
George W. Baker
By Knight & Bro.
Attys.

UNITED STATES PATENT OFFICE.

GEORGE W. BAKER, OF ST. LOUIS, MISSOURI.

IMPROVEMENT IN FRUIT-GATHERERS.

Specification forming part of Letters Patent No. 199,250, dated January 15, 1878; application filed May 18, 1877.

*To all whom it may concern:*

Be it known that I, GEORGE W. BAKER, of the city of St. Louis, State of Missouri, have invented a certain new and useful Improvement in Fruit-Pickers, of which the following is a specification:

My improvement consists in combining, with a pair of cutting-jaws supported on the end of a staff, springs attached rigidly to a sliding collar and hinged to the jaws, so as to force said jaws together, as hereinafter described.

The springs are fixedly attached to the collar at one end, and are hinged to the jaws at the other, so that their action is to snap the jaws together and draw up the collar as soon as the collar is allowed to slip upward by the release of the hand wire or cord.

In the drawings, Figure 1 is a perspective view of the upper part of the apparatus. Fig. 2 is an elevation of the top and bottom portions, showing the lower portion as turned one-fourth around from the position of the upper part. Fig. 3 shows a modification of spring.

A is the staff, which may be made of any convenient length to reach from the operator, standing upon the ground, to the fruit upon the trees. The upper end of the staff has bracket-arms B B, at which the ends of the curved cutting-jaws C C are connected by hinges. These jaws shut together in the manner of shears, the edges lapping past each other a little distance, and shear off any object inside the jaws. These jaws may be semicircular, or made of any other suitable curve, and are formed of hardened steel.

D D, &c., are springs which are hinged to the jaws, and firmly attached at the other ends to the collar E. The collar E slides on the upper end of the staff A as the jaws open and shut. The springs D tend to close the jaws, and the jaws, as they close, draw up the collar E. The collar E is connected, by a thin wire or cord, F, to the hand-lever G, near the lower end of the staff.

The construction is such that the drawing down of the lever G draws down the collar E and opens the jaws, and when the lever G is disengaged the springs D close the jaws, and they sever any fruit-stems that may be in their course.

The upward movement of the lever G is accelerated by a spring, H, by which it is connected to the staff at a point above it. A spring, I, may be placed beneath the collar E, as shown in Fig. 3, so as to increase the force of the jaws in closing.

The springs D may have coiled portions, as shown at *d*, to increase their flexibility; or these coils may be dispensed with.

The edges of the jaws may be serrated or plain.

K is the conducting-tube, of canvas or other suitable material, said tube being attached at the upper end to the back of the jaws, or to some part contiguous thereto, or to both. The lower end of the conducting-tube reaches to the operator or to the ground.

The tube receives the fruit that is clipped off by the jaws, and conducts it down to the operator. It may discharge into a basket or other vessel, or onto the ground; but with superior and tender fruit each one may be received singly, and removed from the lower end of the tube by hand.

I claim as my invention—

1. The combination of jaws C C, sliding collar E, and springs D D D D, attached to said collar and hinged to said jaws, as and for the purpose set forth.

2. The combination of the cutting-jaws C C, springs D D D D, attached rigidly to a sliding collar, E, and adapted to force the jaws together, conducting-tube K, and rod or cord F, substantially as and for the purpose set forth.

GEORGE W. BAKER.

Witnesses:
SAML. KNIGHT,
CHAS. HALL.